United States Patent

Richardson et al.

[15] 3,700,064
[45] Oct. 24, 1972

[54] GAS-CUSHION VEHICLE

[72] Inventors: Harold Richardson; Bruce D. Newman, both of Lachine, Quebec, Canada

[73] Assignee: Hovermarine (Canada) Limited, Lachine, Quebec, Canada

[22] Filed: June 15, 1970

[21] Appl. No.: 46,238

[52] U.S. Cl..................................180/119, 180/117
[51] Int. Cl................................................B60v 1/00
[58] Field of Search.............................180/119, 117

[56] References Cited

UNITED STATES PATENTS

| 3,216,518 | 11/1965 | Beardsley | 180/119 |
| 3,246,712 | 4/1966 | Mackie | 180/119 |
| 3,262,510 | 7/1966 | Froehler | 180/117 X |
| 3,463,263 | 8/1969 | Winter | 180/117 |

FOREIGN PATENTS OR APPLICATIONS

| 937,793 | 9/1963 | Great Britain | 180/119 |

*Primary Examiner*—Kenneth H. Betts
*Attorney*—Stevens, Davis, Miller & Mosher

[57] ABSTRACT

A gas-cushion vehicle is provided with steering means comprising steering members adapted to be brought into contact with the surface over which the vehicle travels and disposed on each side of the fore and aft axis of the vehicle so as to apply steering forces differentially to the vehicle and means for biasing the steering members away from said surface.

3 Claims, 3 Drawing Figures

GAS-CUSHION VEHICLE

This invention relates to gas-cushion vehicles, that is to say, to vehicles for travelling over a surface and which, in operation, are supported above that surface, at least in part, by a cushion of pressurized gas, for example air, formed and contained beneath the body of the vehicle.

A problem exists in providing small gas-cushion vehicles, for example single and two-seat vehicles, with efficient steering arrangements at an economic cost. Various proposals have been tried, for example air-jet propulsion/reverse thrust arrangements and twin-airscrew propulsion units whereby steering is achieved by differential thrust, but the former arrangement is of low efficiency and the latter is costly.

According to the present invention, a gas-cushion vehicle is provided with steering means comprising steering members adapted to be brought into contact with the surface over which the vehicle travels and disposed on each side of the fore and aft axis of the vehicle so as to apply steering forces differentially to the vehicle and means for biasing the steering members away from said surface.

An embodiment of the invention will now be described by way of example with reference to the accompanying drawings wherein.

Figure 1:
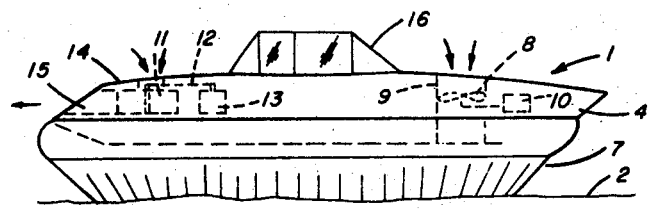
FIG. 1 is a side view of a gas-cushion vehicle.
Figure 2:
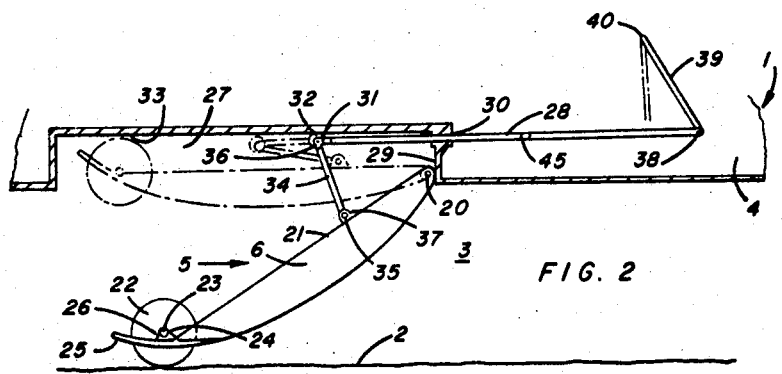
FIG. 2 is a fragmentary longitudinal section of the vehicle with parts removed and illustrates the operation of the steering means.
Figure 3:
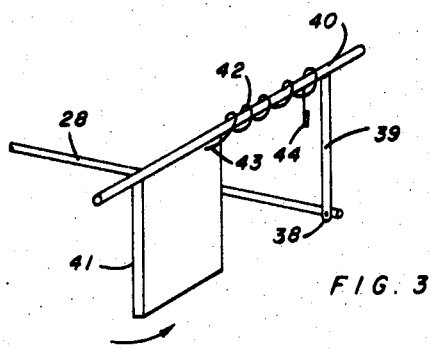
FIG. 3 is a detail, viewed in perspective, of the parts removed from FIG. 2.

With reference to FIGS. 1 to 3, a two-seat amphibious gas-cushion vehicle 1 is shown (in FIG. 1) travelling over a land surface 2 and wholly supported above the surface by a cushion 3 (FIG. 2) of pressurized air formed and contained beneath the body 4 of the vehicle 1.

The vehicle 1 is provided with steering means 5 comprising a laterally-spaced pair of steering members 6 (one only being shown) disposed in the space occupied by the cushion 3 (i.e. the cushion space) adapted to be brought into contact (as in FIG. 2) with the ground surface 2 and disposed on each side of the fore and aft axis of the vehicle 1 so as to apply steering forces differentially to the vehicle. As explained hereinafter, means are provided for biasing the steering members away from the surface 2 towards the retracted position shown in FIG. 2 in dotted outline.

In further detail, and with reference to FIG. 1 only, the vehicle-supporting air-cushion 3 is contained by a flexible skirt 7 of annular form attached to and depending from the periphery of the vehicle body. Air forming the cushion 3 is drawn in from the atmosphere by a fan 8 disposed in a vertical duct 9 extending through the vehicle body 4 and discharged to the cushion space by way of the duct. The fan 8 is driven by an engine 10. The vehicle is propelled by the reactions of air discharged from the rear of the vehicle by a pair of centrifugal fans 11 (one only being shown) disposed one on each side of the fore and aft axis of the vehicle. The fans 11 rotate about vertical axes and are driven, through belts 12, by engines 13. The fans have air intakes 14 and air outlets 15. The vehicle is provided with a control cabin 16.

With reference now to FIGS. 2 and 3, each steering member 6 is of segmented or ski-like shape and is pivotally mounted at one end about a horizontal shaft 20 extending normal to the fore and aft axis of the vehicle, the linear edge 21 of the member 6 facing the vehicle body 4. The other end of the member 6 carries a wheel 22 freely rotatable about a horizontally disposed shaft 23, the ends of which are carried by a pair of arms 24 mounted on a curved ski-like strip 25 attached to the curved bottom edge of the member 6. The lower end of the strip 25 is bifurcated so as to accommodate the wheel 22.

As shown in chain-dotted lines, the member 6 is retractable into a recess 27 formed in the bottom surface of the vehicle body 4. The member 6 is retracted by axial movement of a horizontally-disposed operating shaft 28 which extends through the forward end wall 29 of the recess 27 and is sealed thereto by a bush 30 which also serves to constrain the shaft 28 to axial movement. The rearward end of the shaft 28 carries by way of a support member 31 a roller 32 which bears upwardly against the roof 33 of the recess 27. The roof 33 is flat and is reinforced. A strut member 34 extends between the roller-support member 31 and a bracket 35 attached to the upper edge 21 of the member 6. The strut 34 is pin-jointed to the member 31 and bracket 35 by pins 36, 37 respectively.

With reference now to FIG. 3, the forward end of the shaft 28 is pin-jointed at 38 to the lower end of an operating arm 39. The shaft 28 comprises two shaft members, adjacent ends of which are interconnected by a pin-joint 45 so as to allow rotation of the operating arm 39. The upper end of the arm 39 is attached to a horizontally-disposed shaft 40, disposed within the control cabin of the vehicle, so as to rotate therewith. The ends of the shaft 40 are mounted for free rotation within bearings (not shown) and the shaft carries a foot pedal 41, movement of which rotates the shaft. The pedal 41 is axially spaced from the arm 39. A torsion spring 42 is coiled around the length of shaft 40 between the pedal 41 and arm 39. One end of the spring 42 is attached to the pedal 41 at 43 and the other end to an anchorage 44 within the control cabin. The spring 42 tends to bias the pedal 41 towards the vertical position shown.

As two steering members 6 are provided, two operating pedals 41 and associated components are provided and the pedals 41 disposed so as to be operated by the feet of the driver of the vehicle. (These foot controls can be duplicated if dual control is required.)

In operation, the driver of the vehicle does not operate the pedals 41 until a turning movement of the vehicle is required. With reference to FIG. 2, under these conditions the torsion springs 42 bias the operating shafts 28 rearwardly so that the steering members 6 are each maintained in a retracted position.

If the driver of the vehicle wishes to turn, he pushes, with the appropriate foot, on the pedal 41 to the side he wishes to turn. Movement of the pedal 41 causes forward movement of the operating shaft 28 and this in turn causes the strut 34 to rotate in a clockwise direction (as viewed in FIG. 2) to pivot the steering member 6 downwardly until its wheel 22 contacts the ground surface 2. Contact between the wheel 22 and the ground surface 2 tends to cause rotation of the vehicle 1 about the point of contact and thus direction of movement of the vehicle is changed as desired. Compression forces on the strut 34 are reacted, through the roller 32, by the roof 33 of the recess 27.

Contact between the steering member 6 and the ground surface 2 can be increased by exerting further pressure on the pedal 41. This increase in pedal pressure overrides the effect of the springs 26 and forces the ski-like strip 25 into contact with the ground.

When the pedal 41 is released, its spring 42 draws the operating shaft 28 rearwardly and, as the roller 32 moves along the roof 33 of the recess 27, the strut 34 is rotated so as to retract the steering member 6.

Braking forces can be applied to the vehicle 1 by operating both pedals 41 at the same time.

The invention enables a moderate foot pressure (say 40 lbs.) to exert a much greater contact pressure (say 140 lbs.) between a steering member 6 and the ground surface 2.

At least one of the components, for example the pin 37, is designed to fail by shear due to excess loading so that, for example, large impact forces applied to the steering member 6 by contact with the ground will not be transmitted to the vehicle and thus cause damage to it.

If desired, the wheels 22 can be dispensed with.

We claim:

1. A gas-cushion vehicle having steering means comprising steering members movable into engagement with the surface over which the vehicle travels from a position spaced from said surface, said steering members being located on opposite sides of the fore and aft axis of the vehicle, each steering member including a strut pivotally mounted on the vehicle for angular movement between operative and retracted positions, means for moving the steering members independently of one another, said moving means including a pivoted linkage for each strut operable to move the strut angularly, each pivoted linkage having a movable fulcrum, the vehicle having a fixed structural part against which the movable fulcrum reacts during steering operation, and means biasing the steering members away from said surface.

2. A gas-cushion vehicle according to claim 1 wherein each steering member includes a wheel engageable with the surface.

3. A gas-cushion vehicle according to claim 1 wherein the means for moving the steering members independently of one another comprise separate foot controls.

* * * * *